United States Patent Office 2,996,481
Patented Aug. 15, 1961

2,996,481
COPOLYMERS OF METHACROLEIN
Robert Lee Eifert and Barnard Mitchel Marks, Wilmington, Del., assignors to E. I. du Pont de Nemours and Company, Wilmington, Del., a corporation of Delaware
No Drawing. Filed Jan. 24, 1958, Ser. No. 710,850
9 Claims. (Cl. 260—67)

The present invention relates to novel polymeric products and more particularly to novel copolymers of methacrolein and certain ethylenically unsaturated monomers.

It was heretofore known that small quantities of methacrolein and certain ethylenically unsaturated monomers to modify the properties of the acrylic resin. It was also found, however, that, when the proportion of the methacrolein in the copolymerization with the acrylic monomer was increased to greater than 10 to 15%, employing the prior art polymerization techniques, copolymers resulted which were cross-linked in structure and insoluble in organic solvents.

It is an object of the present invention to prepare high molecular weight, soluble copolymers of methacrolein containing a high percentage of methacrolein.

It is another object of the present invention to prepare high molecular weight copolymers of methacrolein and ethylenically unsaturated monomers, said copolymers having a substantially linear molecular configuration and being soluble in organic solvents.

It is a further object of the present invention to prepare high molecular weight copolymers of methacrolein with ethylenically unsaturated monomers, said copolymers having improved melt flow properties. Other objects will become apparent hereinafter.

In accordance with the present invention it has been discovered that methacrolein can be copolymerized with a comonomer of the class consisting of compounds having vinylic unsaturation and compounds having $\alpha,\beta$-alkendioic unsaturation to give rise to tough, linear, copolymers of high molecular weight containing a larger percentage of methacrolein, which are soluble in organic solvents and have appreciable melt flow at temperatures above the softening point of the polymer. Examples of these comonomers are esters and nitriles of acrylic, methacrylic, fumaric and maleic acid, etc. The comonomer is preferably employed in quantities of 1 to 25 percent by weight of the total monomer concentration.

More specifically, novel copolymers of the present invention include those in which the comonomer may be one or more of the esters of acrylic and methacrylic acid such as the methyl, ethyl, ethoxyethyl, propyl, butyl, hexyl, benzyl, octyl, isooctyl, dodecyl ester, and esters of fumaric and maleic acid such as the dimethyl, diethyl, methylethyl, dipropyl, propylmethyl, propylethyl ester as well as the nitriles of these acids. Preferred esters are those which have from 1 to 5 carbon atoms in the ester group.

The methacrolein copolymers of the present invention are characterized by high molecular weights, ranging from inherent viscosities of 0.3 to 3 as measured in 0.5% concentrations at 35° C. in pyridine, by softening points in the range of 190 to 240° C., by solubility in organic solvents such as dimethyl formamide and pyridine, and by improved melt flow at temperatures above the softening point as compared to the homopolymer of methacrolein. It was surprisingly found that small quantities of the acrylic comonomer caused a significant increase in the melt flow of the polymer and thus greatly increased the ease of fabrication of methacrolein polymers without significantly affecting the mechanical properties of the polymer. The copolymers of the present invention contain from 1 to 25% of the acrylic comonomer. Although it is possible to prepare copolymers with a higher concentration of comonomer, the physical properties of these copolymers do not show the combination of high rigidity and toughness as do the copolymers containing from 1 to 25% of the acrylic comonomer. Furthermore the retention of properties with increasing temperature is greatly reduced as the comonomer concentration is significantly increased beyond 25%.

The methacrolein copolymers of the present invention are prepared by copolymerization of a mixture of the monomers in an aqueous medium in which the monomers are soluble but in which the polymer is not soluble and from which the polymer precipitates out to form a dispersion. The formation of a polymer solution or the formation of a coagulated polymer mass must be avoided to prevent the formation of a cross-linked polymer which is insoluble and intractible and thus not suited for further fabrication into useful articles and shapes. The formation of the cross-linked intractible polymer is believed to result from the further reaction of pendent aldehyde groups in the polymer chains; such reaction can readily occur where the polymer remains in solution. By polymerizing the monomer to finely divided polymer particles, the cross-linking reaction is believed to be reduced to a minimum and the polymerization results in the formation of substantially linear polymers. The formation of substantially linear polymers is achieved by employing a polymerization medium in which the monomer is soluble and in which the polymer is insoluble and carrying out the polymerization under conditions favoring the formation of dispersed polymer. The catalyst employed to initiate the addition copolymerization of methacrolein is a free radical catalyst soluble in the polymerization medium. Although a large variety of free radical catalysts may be employed, such as peroxides for example, it is generally preferred to employ redox catalysts, since these catalysts are soluble in aqueous media and are furthermore less dependent on temperature with respect to the rate of free radical formation. Redox catalysts which are suitable for the polymerization may be formed by the reaction of soluble multivalent metal salts in their higher valence states or by the reaction of any other soluble oxidizing agents such as inorganic peroxides, examples of which are hydrogen peroxide and potassium persulfate, with the alkali metal or ammonium salt of reducing inorganic anions such as the hypophosphite, thiosulfate, sulfite, bisulfite or hyposulfite ions. It was further found, that in the polymerization of methacrolein the oxidizing agent could be omitted and that the copolymerization of methacrolein with comonomers of the present invention could be initiated by simply adding the reducing agent to the reaction medium. A particularly preferred catalyst being an alkali metal or ammonium bisulfite. The quantity of the catalyst employed, calculated on the basis of the reducing agent, is critical and should not exceed 0.005 mol percent of the total monomer concentration. Higher concentrations lead to the formation of lower molecular weight polymers. A suitable catalyst concentration range is from 0.001 to 0.005 mol percent.

The polymerization is preferably carried out in the presence of a finely divided solid such as silica, titania, zirconia, alumina and similar materials. The addition of such compounds as silica aids in the formation of linear copolymers for reasons presently not clearly understood, but possibly the presence of the solid aids in the formation of stable polymer dispersions. The solid need only be employed in minute quantities such as 0.005% by weight of the polymerization medium.

Since the solubility of methacrolein and the acrylic comonomers in water is limited and more concentrated solutions of methacrolein and acrylic comonomer are desirable in order to prepare methacrolein copolymers having high molecular weights at efficient polymerization rates, reaction media comprising water and organic solvents which are miscible with water and which increase the solubility of the methacrolein and its comonomer in the reaction medium are preferably employed. The low molecular weight alcohols are suitable for such purposes. Particularly preferred are aliphatic alcohols having from 1 to 5 carbon atoms such as methanol, ethanol, butanols, isopropanol, etc. The quantity of the alcohol employed will depend on the amount of the monomers that is required to be in solution. The monomer concentration in the reaction medium is maintained in a range of 7 to 40% and preferably from 20 to 40% by weight of the medium. Higher concentrations cause coagulation of the dispersed polymer. If desirable, the concentration may be slightly increased by the addition of dispersing agents which inhibit the coagulation of the polymer formed.

The polymerization is preferably carried out at temperatures below 50° C. and preferably at temperatures of 20 to 35° C. in the substantial absence of oxygen. The monomers employed should be free from impurities. It is therefore highly desirable to purify commercially available methacrolein by distillation or treatment with absorbents which will remove the impurities prior to use in the polymerization. The polymerization is furthermore preferably carried out in a slightly acidic medium.

The copolymers of the present invention are characaterized and evaluated in the examples below by their inherent viscosity, flow numbers and softening points. As stated hereinabove, the viscosity of the copolymer is determined from 0.5% concentrations of the copolymer in pyridine at 35° C. The inherent viscosity of the methacrolein copolymers is calculated from the following equation $$\zeta \text{ inh} = \ln\left(\frac{t}{t_0}\right) \times \frac{1}{C}$$

where $t_0$ is the viscosity of the solvent, and $t$ the viscosity of the polymer solution and C the concentration of the polymer in the solvent in g. per 100 cc. of solvent. Although the inherent viscosity in only a relative measure of molecular weight, it is highly useful to establish the suitability of a particular copolymer for plastic applications. Thus, copolymers having inherent viscosities below 0.3 are of too low molecular weight in that they are too brittle to be considered for plastic applications. Polymers having inherent viscosities above 3 are equally unsuitable for plastic applications since such polymers are difficult to fabricate by melt extrusion or injection molding. The copolymers of the present invention are those which have inherent viscosities in the range of 0.3 to 3.0 and preferably have inherent viscosities in the range of 0.5 to 1.5. A further measure of the suitability of a polymer for fabrication by melt extrusion or injection molding is a measure of the melt flow of the polymer. The melt flow of the methacrolein copolymers of the present invention is measured by flow numbers, which are a measure of the quantity of molten polymer in grams which will flow through an orifice 0.0823" in diameter over a period of 10 minutes at a temperature of 275° C. when subjected to a pressure exerted by a 3800 g. weight on a piston 5/16" in diameter. The melt flow equipment employed in the present invention is similar to the equipment employed in the determination of melt index, which is described in detail in ASTM-D-1238-52T, except for the differences in temperature and weight stated above. An additional characterization of the polymer is its melting point. However, since the methacrolein copolymers of the present invention are amorphous, they do not have the sharp melting point that can be observed with crystalline polymers but show a gradual change from the solid to the liquid stage with increasing temperature. The term softening point is therefore more appropriate for the copolymers of the present invention. The softening points given for the copolymers of the present invention were obtained by recording the temperature at which the polymer leaves a molten trail when moved across the surface of a heated block under slight positive pressure. The temperature of the block is increased at the rate of 1° C. per minute.

The invention is further illustrated by the following examples:

Example I

Into a glass stoppered Erlenmeyer flask was charged under nitrogen with mild agitation 96 ml. of deoxygenated, distilled water, 0.4 ml. of "Ludox," a commercially available aqueous dispersion of colloidal silica containing approximately 30% of silicon dioxide, 100 ml. of methanol, 97 ml. of methacrolein, 3 ml. of ethyl acrylate, 3.6 ml. of a 1% aqueous solution of sodium bisulfite as the catalyst, corresponding to a catalyst concentration of $1.15 \times 10^{-3}$ moles per liter of reaction medium, and four drops of acetic acid to bring the pH of the reaction mixture to 4.4. On addition of the ingredients, the reaction mixture was allowed to stand for a period of 20 hours.

To the resulting polymer dispersion was added 35 ml. of a 2% solution of 2,6-di-tert.butyl-4-methyl-phenol to stabilize the polymer. The dispersion was then coagulated by the addition of sodium sulfate. The polymer was collected by filtration, washed with water and methanol, treated again with the same quantity of antioxidant, and dried in a vacuum oven. A white solid polymer comprising 62.7% of the starting material, having an inherent viscosity of 1.11 and a softening point of approximately 205° C. was obtained. The flow numbers of the polymer after 7, 10, 15 and 20 minutes were measured to be 0.35, 0.63, 1.1 and 1.7. A homopolymer of methacrolein prepared with the identical polymerization recipe was found to have a softening point at 213° C. and flow numbers after 7, 10, 15 and 20 minutes of 0.2, 0.27, 0.49 and 0.78. The polymer could be molded into stiff, transparent films by heating the polymer to a temperature of 250° to 275° C.

Example II

Employing the procedure of Example I, 5% of ethyl acrylate, based on the total monomer concentration, was copolymerized with methacrolein. The weight of the resulting polymer was 26.4 g. corresponding to a 62.2% conversion. The copolymer was found to have an inherent viscosity of 1.09, a softening point at approximately 205° C., and had flow numbers of 0.5, 0.9, 1.4 and 2.0 after 7, 10, 15 and 20 minutes exposure at 275° C. respectively.

Example III

Employing the procedure of Example I, 12% of ethyl acrylate was copolymerized with methacrolein employing a catalyst concentration of $1.6 \times 10^{-3}$ moles per liter. The weight of the resulting copolymer was 25.3 g. corresponding to a 59% conversion. The copolymer was found to have an inherent viscosity of 0.97 and a softening point at approximately 198° to 200° C. The melt flow as measured in flow numbers at 275° was found to be 4.4, 6.0, 9.6 and 11.6 after 7, 10, 15 and 20 minutes exposure respectively.

Example IV

Employing the procedure of Example I, 10% of ethyl acrylate, based on the total monomer concentration, was copolymerized with methacrolein. The weight of the washed and dried copolymer was 23 g. corresponding to a 54.4% conversion. The polymer was found to have an inherent viscosity of 1.06 and flow numbers of 1.1, 1.4, 2.0 and 3.0 after 7, 10, 15 and 20 minutes exposure at 275° C. respectively.

*Example V*

Employing the procedure of Example I, 25% of ethyl acrylate based on the total monomer concentration was copolymerized with methacrolein employing a catalyst concentration of $0.8 \times 10^{-3}$ moles per liter. The weight of the washed and dried product was 15 g. corresponding to a 35% conversion. The inherent viscosity of the copolymer was measured to be 1.4 and the softening point was found to be 190° C. The melt flow of the copolymer, as measured in flow numbers at 275° C., was found to be 0.8, 2.0, 2.9 and 5.3 after 7, 10, 15 and 20 minutes exposure respectively.

*Example VI*

Employing the procedure of Example I, 88 ml. of methacrolein was copolymerized with 12 ml. of butyl acrylate employing a catalyst concentration of $2.3 \times 10^{-3}$ moles per liter. The weight of the washed and dried product was 53.8 g. corresponding to a conversion of 63.5%. The copolymer was found to have an inherent viscosity of 1.05. The melt flow of the polymer as measured in flow numbers at 275° C. was found to be 8.1, 9.2, 11.4 and 15.6 after 7, 10, 15 and 20 minutes exposure respectively.

*Example VII*

Into a glass stoppered Erlenmeyer flask was charged under nitrogen 60 ml. of deoxygenated, distilled water, 0.1 ml. of "Ludox," 100 ml. of isopropanol, 45 ml. of methacrolein, 5 ml. of dimethyl-maleate, 5 mg. of a 75:25 mixture cobalt oxide and cupric oxide, 2.4 ml. of a 1% solution of sodium bisulfite, 10 mg. of potassium persulfate, and two drops of acetic acid to make the reaction medium acidic. On standing for 20 hours, 35 ml. of a 2% aqueous solution of 2,6-di-tert.butyl-4-methylphenol was added and the reaction mixture was coagulated with $Na_2SO_4$, the polymer collected by filtration, washed, treated with a similar portion of antioxidant and dried. The resulting polymer weighed 14.3 g. corresponding to a conversion of 34%. The polymer was found to have an inherent viscosity of 0.83 and a melt flow as measured by flow numbers at 275° C. of 2, 3, 4.5 and 6.3 at 7, 10, 15 and 20 minutes exposure respectively.

*Example VIII*

Into a glass stoppered Erlenmeyer flask was charged 30 ml. of deoxygenated distilled water, 0.1 ml. of "Ludox," 50 ml. of isopropanol, 45 ml. of methacrolein, 5 ml. of diethyl fumarate, 3 mg. of a 75:25 mixture of $Co_2O_3$ and CuO, 1.8 ml. of a 1% aqueous solution of sodium bisulfite, 10 mg. of potassium persulfate and 3 drops of acetic acid to make the reaction medium acidic. On standing for 20 hours, 35 cc. of a 2% aqueous solution of 2,6-di-tert.butyl-4-methylphenol was added and the reaction mixture was agitated to cause coagulation of the copolymer dispersion. The coagulated polymer was filtered, washed and dried and weighed 11.8 g. corresponding to a 28% conversion. The polymer was found to have an inherent viscosity of 0.71 and a melt flow as measured by flow numbers at 275° C. of 1.3, 1.6, 2.3 and 3.1 at 7, 10, 15 and 20 minutes exposure respectively.

*Example IX*

Employing the procedure shown in Example VIII, 45 ml. of methacrolein was copolymerized with 5 ml. of acrylonitrile. A copolymer weighing 5.9 g. corresponding to a 14% conversion having an inherent viscosity of 0.81 was obtained.

The methacrolein copolymers of the present invention are high molecular weight resins which on molding, extrusion or casting from solution form rigid, tough, highly transparent shapes suitable for a large variety of plastic applications. In contrast to the prior art methacrolein copolymers, they differ in chemical composition and/or structure. The copolymers of the present invention have substantially the mechanical properties of linear polymethacroleins and differ from prior art linear copolymers of methacrolein in their high methacrolein content, which gives rise to the highly useful properties of rigidity and transparency. They differ from the prior art methacrolein copolymers having high concentration of methacrolein in their physical structure in that they are substantially linear polymers as contrasted to the cross-linked structure of prior art polymers, in that they are soluble in organic solvents and in that they can be fabricated by melt extrusion and molding techniques. The copolymers of the present invention although employing only small quantities of comonomer are highly improved in melt flow over substantially linear polymethacrolein. This improved melt flow of the methacrolein copolymers with the acrylic monomers is obtained without a significant loss of the solid state mechanical properties as compared to the homopolymers of methacrolein.

The methacrolein copolymers of the present invention are suitably employed in lighting fixtures, ornamental designs, outdoor signs, packaging films and in coating applications. Fibers may be prepared from the copolymers of the present invention using melt or solution spinning techniques.

We claim:

1. A copolymer of monomers consisting essentially of methacrolein and a comonomer of the class consisting of alkyl esters of acrylic acid, fumaric acid and maleic acid, wherein the ester radical contains from 1 to 5 carbon atoms, said copolymer containing from 1 to 25 weight percent of said comonomer and having an inherent viscosity, as determined on a 0.5 percent solution in pyridine at 35° C., of 0.3 to 3.0.

2. A copolymer of monomers consisting essentially of methacrolein and an alkyl acrylate, wherein the alkyl radical contains from 1 to 5 carbon atoms, said copolymer containing from 1 to 25 weight percent of said alkyl acrylate and having an inherent viscosity, as determined on a 0.5 percent solution in pyridine at 35° C., of 0.3 to 3.0.

3. A copolymer of monomers consisting essentially of methacrolein and ethyl-acrylate, said copolymer containing from 1 to 25 weight percent of said ethyl acrylate and having an inherent viscosity, as determined on a 0.5 percent solution in pyridine at 35° C., of 0.3 to 3.0.

4. A copolymer of monomers consisting essentially of methacrolein and a dialkyl fumarate, wherein the alkyl radical contains from 1 to 5 carbon atoms, said copolymer containing from 1 to 25 weight percent of said dialkyl fumarate and having an inherent viscosity, as determined on a 0.5 percent solution in pyridine at 35° C., of 0.3 to 3.0.

5. A copolymer of monomers consisting essentially of methacrolein and a dialkyl maleate, wherein the alkyl radical contains from 1 to 5 carbon atoms, said copolymer containing from 1 to 25 weight percent of said dialkyl maleate and having an inherent viscosity, as determined on a 0.5 percent solution in pyridine at 35° C., of 0.3 to 3.0.

6. The copolymer of claim 1 in film form.

7. The copolymer of claim 1 in fiber form.

8. The process of copolymerizing methacrolein and a comonomer of the class consisting of the nitriles and alkyl esters of acrylic acid, methacrylic acid, fumaric acid and maleic acid, wherein the ester radical contains from 1 to 5 carbon atoms, which comprises polymerizing a mixture of methacrolein and said comonomer with an aqueous medium containing sufficient of an aliphatic water-miscible alcohol of 1 to 5 carbon atoms to maintain said monomers in solution, said methacrolein and monomer being employed in a ratio of 99:1 to 75:25 in a concentration of 7 to 40% by weight of the medium, said aqueous medium further containing from 0.001 to 0.005 mol percent, based on the monomers of bisulfite ion, and up to 0.005 weight percent, based on the aqueous medium of finely divided silica, at a temperature of 20 to 35° C., in the substantial absence of oxygen.

9. The process as set forth in claim 8 wherein the comonomer is an alkyl acrylate.

References Cited in the file of this patent

UNITED STATES PATENTS

| | | |
|---|---|---|
| 2,416,536 | Neher et al. | Feb. 25, 1947 |
| 2,651,624 | Swart | Sept. 8, 1953 |
| 2,657,192 | Miller et al. | Oct. 27, 1953 |

UNITED STATES PATENT OFFICE
CERTIFICATE OF CORRECTION

Patent No. 2,996,481            August 15, 1961

Robert Lee Eifert et al.

It is hereby certified that error appears in the above numbered patent requiring correction and that the said Letters Patent should read as corrected below.

Column 1, line 14, for "and certain ethylenically unsaturated monomers" read -- could be copolymerized with acrylic monomers --; column 3, lines 35 and 36, the formula should appear as shown below instead of as in the patent:

$$\eta\,inh = \ln\left(\frac{t}{t_0}\right) \times \frac{1}{C}$$

column 3, line 42, for "in only" read -- is only --;
column 6, line 73, after "75:25" insert -- and --.

Signed and sealed this 9th day of January 1962.

(SEAL)
Attest:

ERNEST W. SWIDER            DAVID L. LADD
Attesting Officer            Commissioner of Patents